(12) United States Patent
Sturgin

(10) Patent No.: US 8,132,655 B2
(45) Date of Patent: Mar. 13, 2012

(54) MULTI FUNCTION TORQUE CONVERTER WITH AXIALLY STACKED CLUTCHES AND METHOD OF CONTROLLING HYDRAULIC PRESSURE AND FLOW

(75) Inventor: Todd J. Sturgin, Shreve, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 638 days.

(21) Appl. No.: 12/001,160

(22) Filed: Dec. 10, 2007

(65) Prior Publication Data
US 2008/0149442 A1 Jun. 26, 2008

Related U.S. Application Data

(60) Provisional application No. 60/876,214, filed on Dec. 21, 2006.

(51) Int. Cl.
*F16H 45/02* (2006.01)
(52) U.S. Cl. ...................... 192/3.25; 192/3.29
(58) Field of Classification Search .......... 192/3.25, 192/3.26, 3.27
See application file for complete search history.

(56) References Cited

U.S. PATENT DOCUMENTS

| | | | |
|---|---|---|---|
| 3,820,417 A | 6/1974 | Allen et al. | |
| 4,867,290 A * | 9/1989 | Macdonald et al. | 192/3.28 |
| 5,575,364 A * | 11/1996 | Friedmann et al. | 192/3.29 |
| 5,699,887 A * | 12/1997 | Kundermann | 192/3.26 |
| 6,325,190 B1 | 12/2001 | Yoshimoto et al. | |
| 6,494,303 B1 | 12/2002 | Reik et al. | |
| 6,814,194 B2 | 11/2004 | Back et al. | |
| 6,881,171 B2 | 4/2005 | Kuhstrebe et al. | |
| 2001/0020402 A1 | 9/2001 | Shichinohe et al. | |
| 2004/0188208 A1 | 9/2004 | Leber | |
| 2006/0086584 A1 | 4/2006 | Maucher et al. | |

FOREIGN PATENT DOCUMENTS

| | | |
|---|---|---|
| DE | 19508613 | 9/1996 |
| DE | 10024191 | 11/2000 |
| JP | 02203078 A | 8/1990 |
| WO | WO 2004/003400 A1 | 1/2004 |

* cited by examiner

*Primary Examiner* — Rodney Bonck
(74) *Attorney, Agent, or Firm* — Simpson & Simpson, PLLC

(57) ABSTRACT

A torque converter including an impeller clutch connected to an impeller; a torque converter clutch connected to an output hub for the torque converter; and a same plate included in the impeller clutch and in the torque converter clutch and at least indirectly connected to a cover for the torque converter. The impeller clutch includes a first portion exclusive of the same plate, the torque converter clutch includes a second portion exclusive of the same plate, and in some aspects, the same plate is axially disposed between the first and second portions. In some aspects, the torque converter includes a damper assembly rotationally connected to the same plate and the cover. In torque converter mode, an impeller clutch release chamber and the torus are hydraulically isolated.

12 Claims, 12 Drawing Sheets

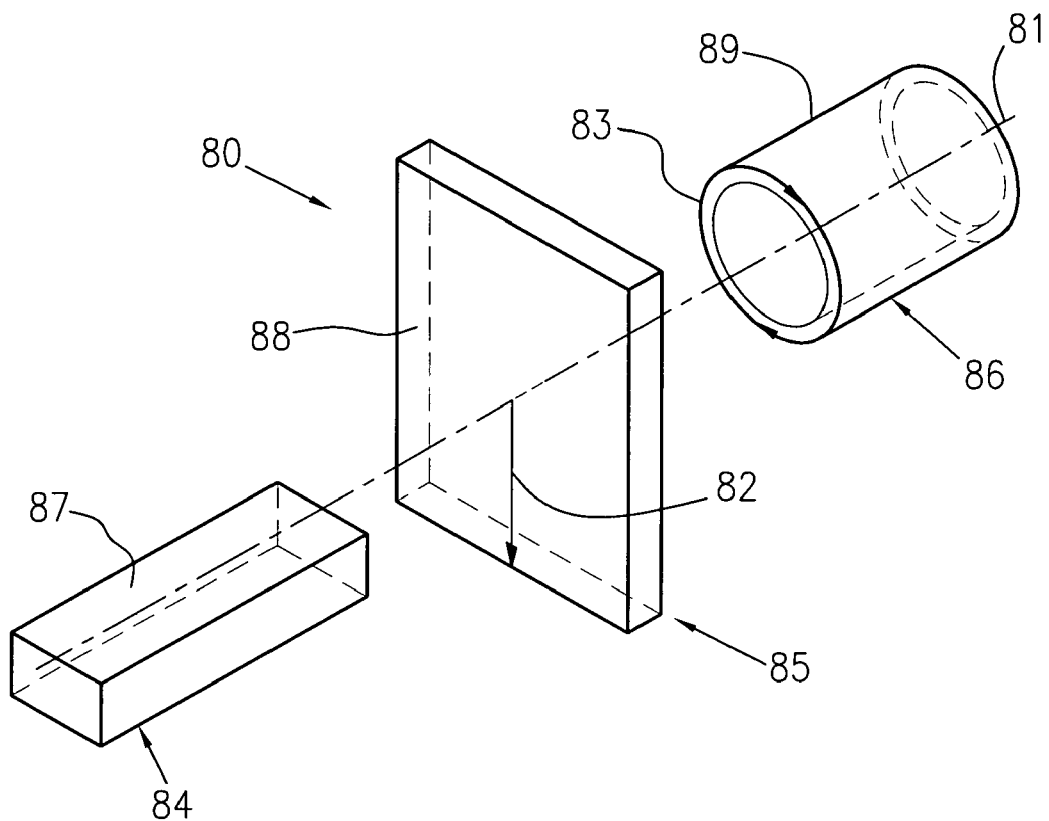
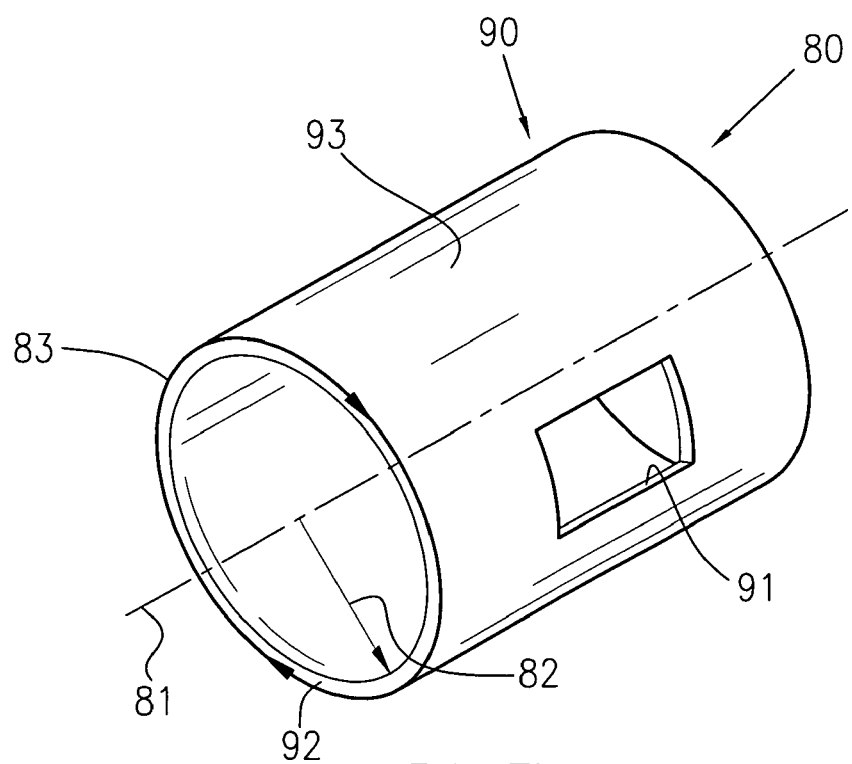

MULTI FUNCTION TORQUE CONVERTER WITH AXIALLY STACKED CLUTCHES AND METHOD OF CONTROLLING HYDRAULIC PRESSURE AND FLOW

CROSS-REFERENCE TO RELATED APPLICATIONS

This application claims the benefit under 35 U.S.C. §119 (e) of U.S. Provisional Application No. 60/876,214 filed Dec. 21, 2006.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to a multi function torque converter with axially stacked impeller and torque converter clutches.

BACKGROUND OF THE INVENTION

FIG. 1 illustrates a general block diagram showing the relationship of the engine 7, torque converter 10, transmission 8, and differential/axle assembly 9 in a typical vehicle. It is well known that a torque converter is used to transmit torque from an engine to a transmission of a motor vehicle.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At high speed ratios, the torque converter is less efficient. The torque ratio of the torque converter gradually reduces from a high of about 1.8 to 2.2, to a torque ratio of about 1 as the turbine rotational speed approaches the pump rotational speed. Torque ratio of 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Maximum torque converter efficiency is limited to 92-93% based on losses in the fluid. Therefore torque converter clutch 49 is employed to mechanically connect the torque converter input to the output, improving efficiency to near 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis.

Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

It is desirable to reduce the axial length of a torque converter. For a torque converter with an impeller clutch and a torque converter clutch a certain amount of the axial length is due to the configuration of the clutches. Also, for torque converters with some clutch configurations, oil flows through the torus, absorbs heat to cool the torus, and typically passes through openings in the friction material for the impeller clutch. Unfortunately, the heated oil can undesirably raise the temperature of the friction material. Further, for torque converters with some configurations, the torus is in fluid communication with the release pressure chamber for the clutch. Unfortunately, the torus and the release chamber have conflicting requirements. It is desirable to maintain high pressure in the torus to prevent cavitation and to enable proper cooling flow, while at the same time, it is desirable to maintain pressure as low as possible in the release chamber to minimize the pressure needed to engage the clutch.

Therefore, there is a long-felt need in a torque converter to reduce the axial length associated with an impeller clutch and a torque converter clutch, to avoid adding heat to friction material through oil flow, and to resolve the conflicting requirements for pressure in a pump clutch release chamber and the torus.

BRIEF SUMMARY OF THE INVENTION

The present invention broadly comprises a torque converter including a first clutch; a second clutch; and a plate disposed in a torque transmission path from a cover for the torque converter to the first and second clutches. The first and second clutches each includes the radially disposed plate. The torque converter includes an impeller and an output hub and the first clutch includes an impeller clutch arranged to transmit torque from the cover to the impeller. The second clutch includes a torque converter clutch arranged to transmit torque from the cover to the output hub. The impeller clutch includes a first portion exclusive of the radially disposed plate, the torque converter clutch includes a second portion exclusive of the radially disposed plate, and the radially disposed plate is axially disposed between the first and second portions.

In some aspects, the torque converter includes a damper assembly disposed in the torque transmission path and the same plate is connected to the damper assembly.

The present invention also broadly comprises a torque converter including an impeller clutch connected to an impeller; a torque converter clutch connected to an output hub for the torque converter; and a same plate included in the impeller clutch and in the torque converter clutch and at least indirectly connected to a cover for the torque converter. The impeller clutch includes a first portion exclusive of the same plate, the torque converter clutch includes a second portion exclusive of the same plate, and in some aspects, the same plate is axially disposed between the first and second portions. In some aspects, the same plate is displaceable to at least partially enable closing of the impeller clutch and the torque converter clutch. In some aspects, the torque converter includes a damper assembly rotationally connected to the same plate and the cover.

In some aspects, the impeller clutch includes a plate and friction material and the torque converter clutch includes a piston plate; and the torque converter includes an impeller cover; a turbine; a first chamber including the turbine and the impeller and at least partially defined by the plate, the piston plate, and the turbine cover; a second chamber at least partially defined by the same plate and the piston plate; and a third chamber at least partially defined by the torque converter cover, the impeller cover, the plate, and the same plate. Then, in the torque converter mode, pressure for fluid in the second chamber is arranged to be greater than pressures for respective fluids in the first and third chambers, the first and second chambers are in fluid communication, the fluid in the second chamber is arranged to flow through the first chamber to cool the turbine and impeller, and the flow of fluid from the second chamber to the first chamber bypasses the friction material.

The present invention broadly comprises a torque converter including a damper assembly connected to a cover for the torque converter; an impeller clutch connected to an impeller; a torque converter clutch connected to an output hub for the torque converter; and a plate included in the impeller clutch and in the torque converter clutch and connected to the damper assembly. The impeller clutch includes a first portion exclusive of the plate, the torque converter clutch includes a second portion exclusive of the plate, and the plate is axially disposed between the first and second portions.

The present invention also broadly comprises a method of operating a torque converter including the steps of maintaining pressure for fluid in a second chamber greater than pressures for respective fluids in first and third chambers, the first chamber including a torus; opening, in response to maintaining hydraulic pressure in the first, second and third chambers, a mechanical torque transmission path between a cover for the torque converter and an output hub; closing, in response to maintaining hydraulic pressure in the first, second and third chambers, a torque transmission path between the cover and an impeller; and flowing the fluid from the second chamber to the first chamber to cool the torus. The torque path between the cover and the impeller includes friction material and the method includes bypassing the friction material with the flow between the second and first chambers. In some aspects, the torque converter further comprises a damper assembly and the respective torque transmission paths pass through the damper assembly.

The present invention further broadly comprises a method of operating a torque converter including the steps of engaging an impeller clutch to transmit torque from a cover for the torque converter through a damper assembly to an impeller; and engaging, while the impeller clutch remains engaged, a torque converter clutch to transmit torque from the cover through the damper assembly to an output hub. The impeller clutch and the torque converter clutch each comprise a same piston plate and the impeller clutch comprises a first portion exclusive of the plate, the torque converter clutch comprises a second portion exclusive of the plate, and the plate is axially disposed between the first and second portions.

It is a general object of the present invention to provide a torque converter with impeller and torque converter clutches sharing a plate to reduce the axial length of the clutches.

It is another general object of the present invention to provide a torque converter with a torus cooling flow that bypasses frictional material for an impeller clutch.

It is a further general object of the present invention to provide a torque converter with a hydraulically isolated impeller clutch release chamber and torus.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 7A is a perspective view of a cylindrical coordinate system demonstrating spatial terminology used in the present application;

FIG. 7B is a perspective view of an object in the cylindrical coordinate system of FIG. 7A demonstrating spatial terminology used in the present application;

DETAILED DESCRIPTION OF THE INVENTION

Figure 1:
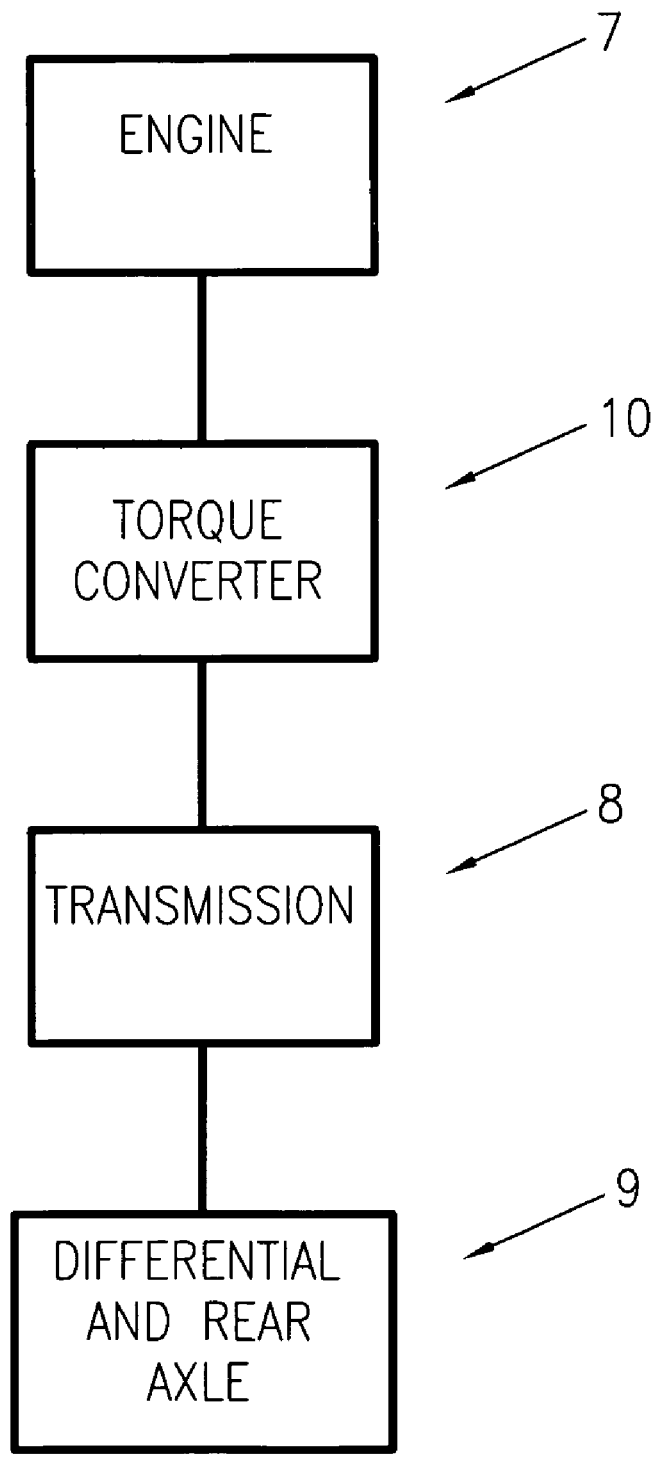
FIG. 1 is a general block diagram illustration of power flow in a motor vehicle, intended to help explain the relationship and function of a torque converter in the drive train thereof.
Figure 2:
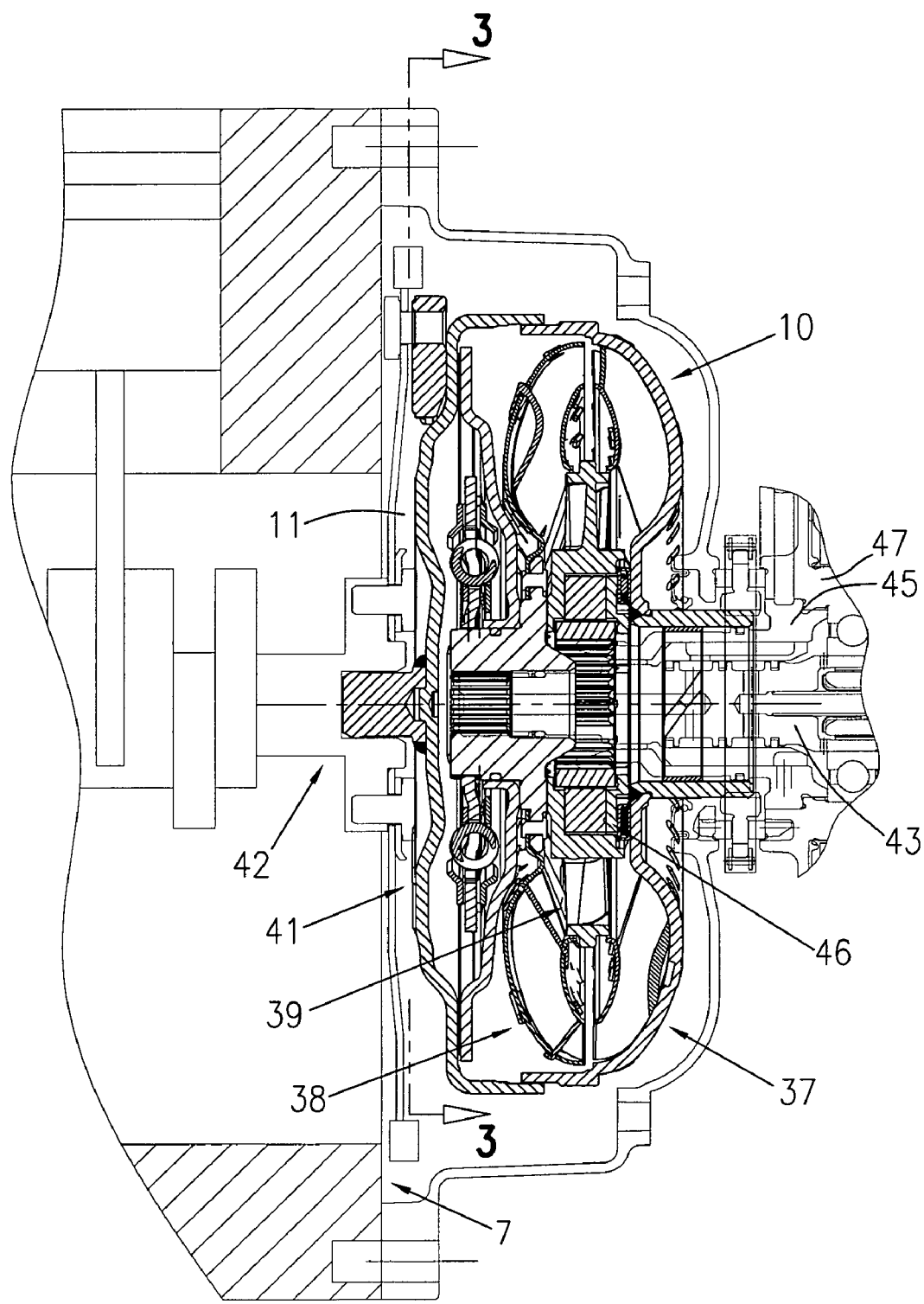
FIG. 2 is a cross-sectional view of a prior art torque converter, shown secured to an engine of a motor vehicle.
Figure 3:
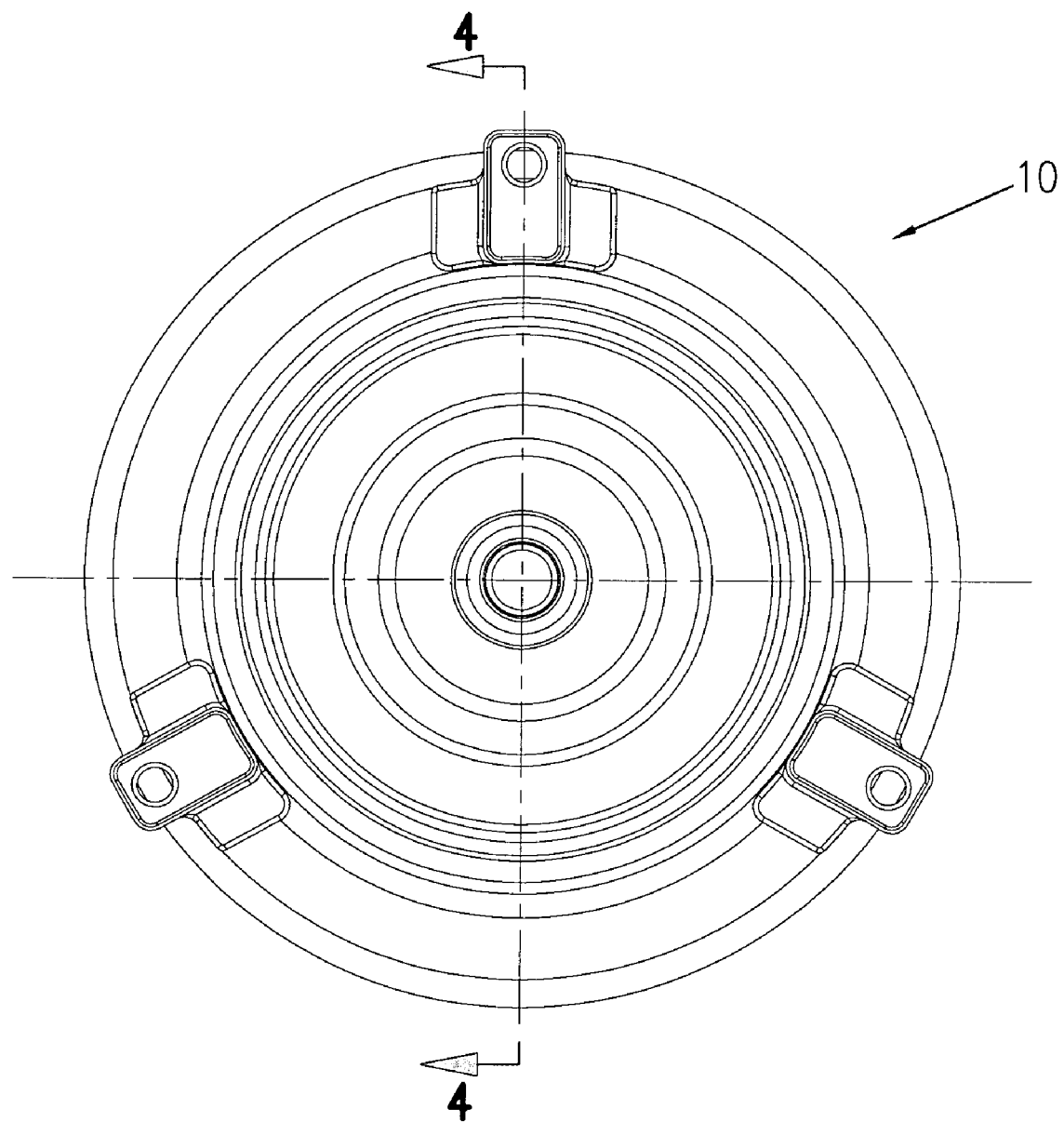
FIG. 3 is a left view of the torque converter shown in FIG. 2, taken generally along line 3-3 in FIG. 2.
Figure 4:
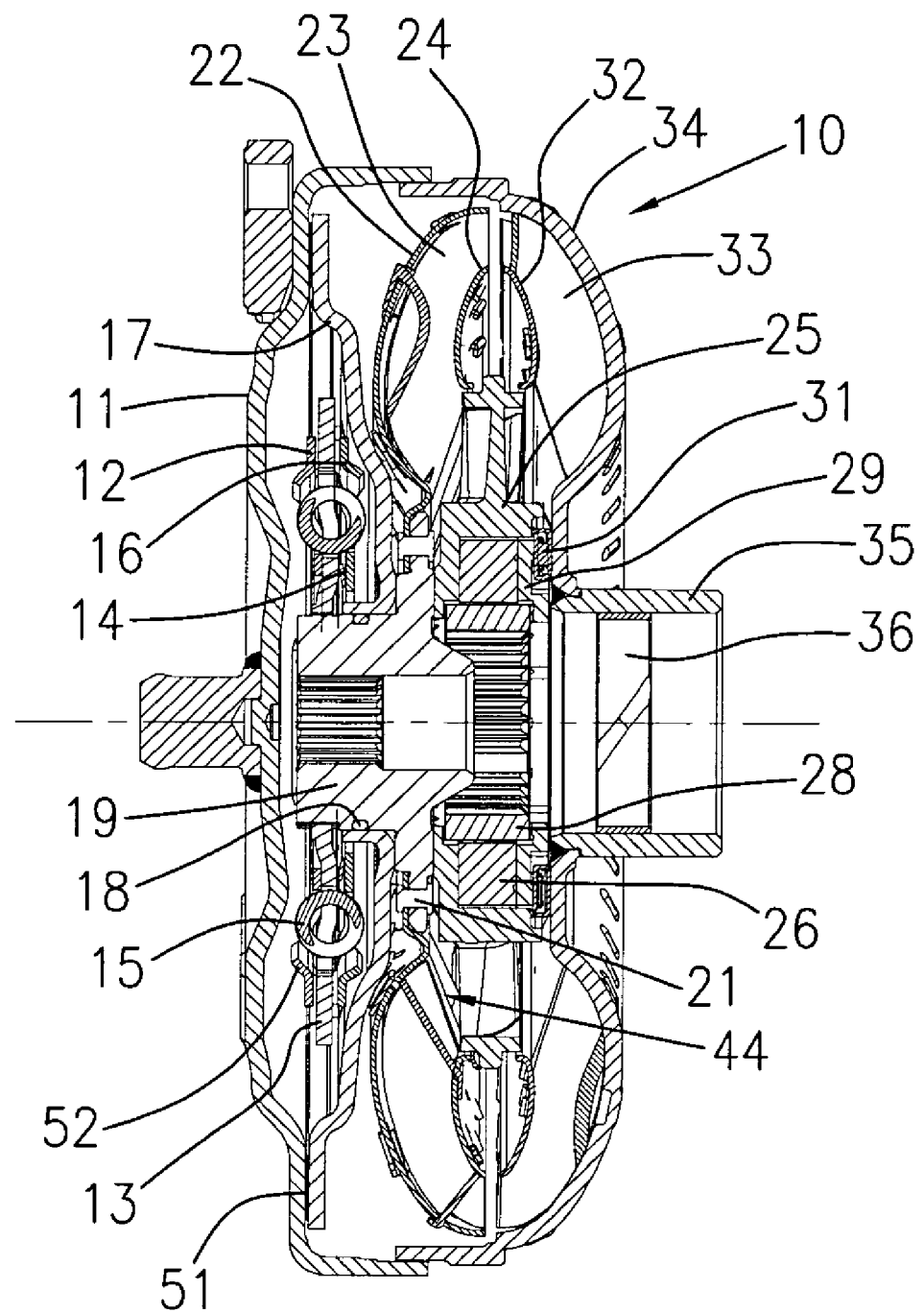
FIG. 4 is a cross-sectional view of the torque converter shown in FIGS. 2 and 3, taken generally along line 4-4 in FIG. 3.
Figure 5:
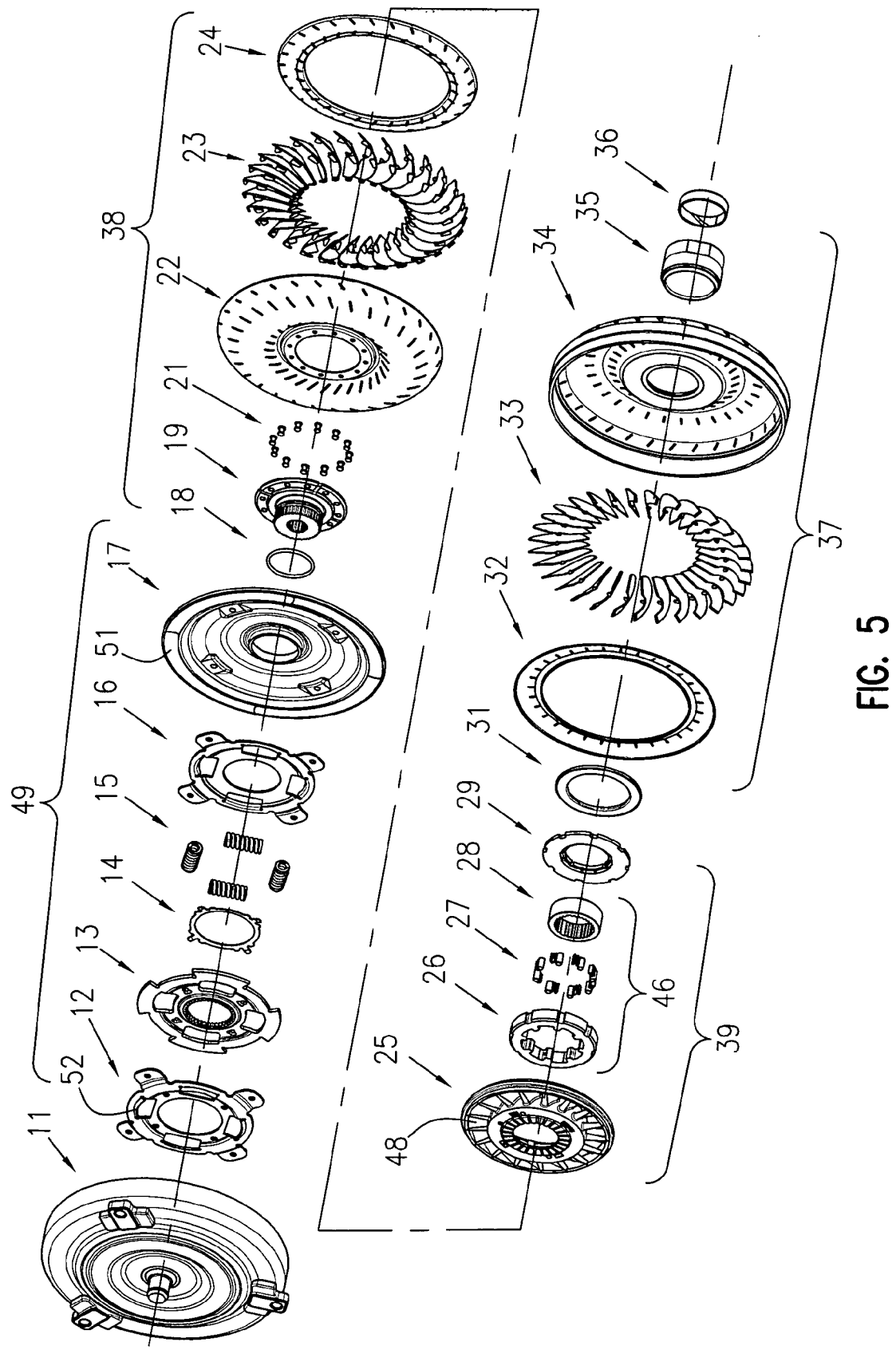
FIG. 5 is a first exploded view of the torque converter shown in FIG. 2, as shown from the perspective of one viewing the exploded torque converter from the left.
Figure 6:
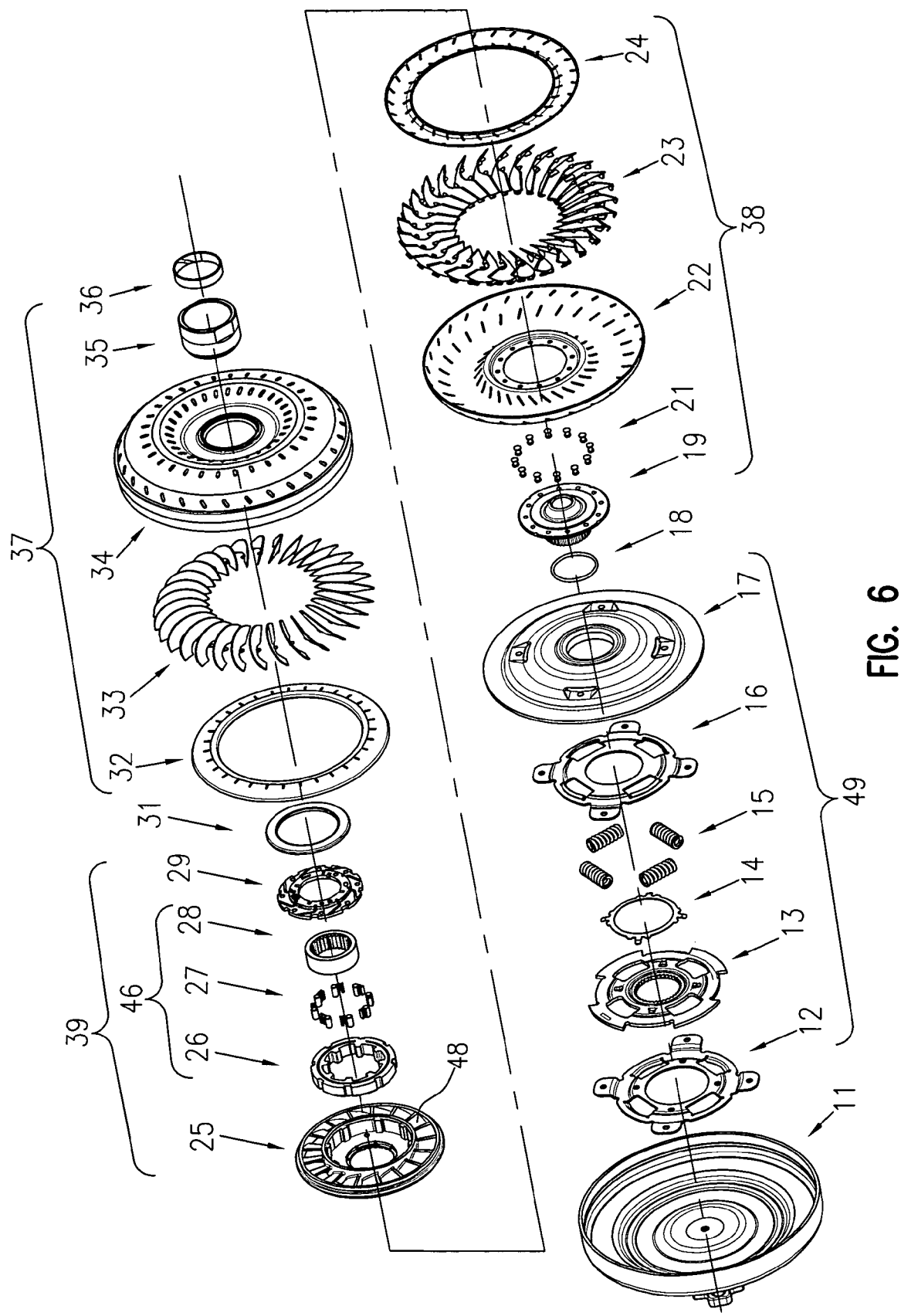
FIG. 6 is a second exploded view of the torque converter shown in FIG. 2, as shown from the perspective of one viewing the exploded torque converter from the right.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

FIG. 7A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

FIG. 7B is a perspective view of object 90 in cylindrical coordinate system 80 of FIG. 7A demonstrating spatial terminology used in the present application. Cylindrical object 90 is representative of a cylindrical object in a cylindrical coordinate system and is not intended to limit the present invention is any manner. Object 90 includes axial surface 91, radial surface 92, and circumferential surface 93. Surface 91 is part of an axial plane, surface 92 is part of a radial plane, and surface 93 is part of a circumferential plane.

Figure 8:
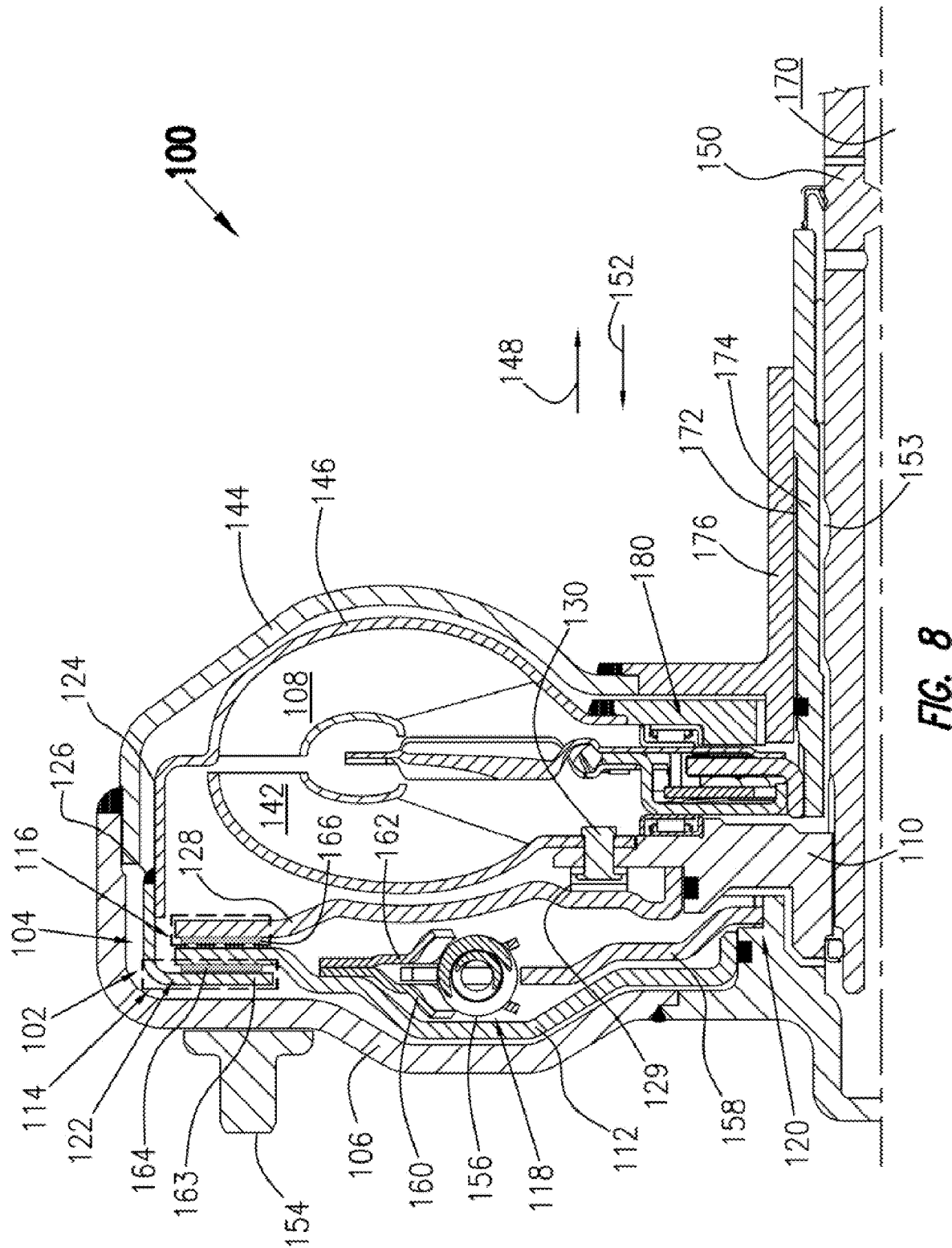
FIG. 8 is a partial cross-sectional view of a present invention torque converter.

FIG. 8 is a partial cross-sectional view of present invention torque converter 100. Torque converter 100 includes impeller clutch 102 and torque converter, or lock-up, clutch 104. A portion of clutch 102 is connected to cover 106 and another portion of the clutch is connected to impeller 108. Clutch 102 is arranged to transmit torque from cover 106 to impeller 108. In some aspects, the respective portions of clutch 102 are directly connected to the cover and the impeller. A portion of clutch 104 is connected to the cover and another portion of the clutch is connected to output hub 110. Clutch 104 is arranged to transmit torque from the cover to output hub 110. In some aspects, the respective portions of clutch 104 are directly connected to the cover and output hub 110.

Clutches 102 and 104 include a same plate, that is, a single plate that forms part of each clutch. The plate is at least indirectly connected to cover 106. In some aspects, the plate is plate 112. In some aspects, plate 112 is a radially disposed piston plate.

Clutch 102 includes portion 114, exclusive of plate 112 and clutch 104 includes portion 116, exclusive of plate 112. That is, portions 114 and 116 are those respective portions of the clutches that do not include plate 112. In some aspects, plate 112 is axially disposed between portions 114 and 116. The configuration of the clutches reduces the axial extent of the clutch combination and thus advantageously reduces the axial length of torque converter 100. In some aspects, and as described infra, plate 112 is displaceable, specifically, axially displaceable to at least partially engage clutches 102 and 104.

In some aspects, torque converter 100 includes damper assembly 118, rotationally connected to cover 106 and to clutches 102 and 104. By rotationally connected, or secured, we mean that the assembly and the cover and clutches are connected such that the respective components rotate together, that is, the components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra. The preceding connections are made by any means known in the art. For example, assembly 100 can be connected to the cover using spline connection 120. In some aspects, plate 112 is connected to assembly 118 by any means known in the art, for example, rivets, and forms the connection point between the damper assembly and clutches 102 and 104.

In some aspects (not shown), torque converter 100 does not include a damper assembly. For some of these aspects, clutch 102 or 104 is allowed to slip when torque spikes are transmitted to the torque converter.

In some aspects, clutch 102 includes plate 122, which is connected to impeller cover extension 124 by any means known in the art, for example, weld 126. In some aspects, clutch 104 includes plate 128, which is rotationally connected to hub 110 by any means known in the art, for example, leaf springs 129 and rivets 130.

Figure 9:
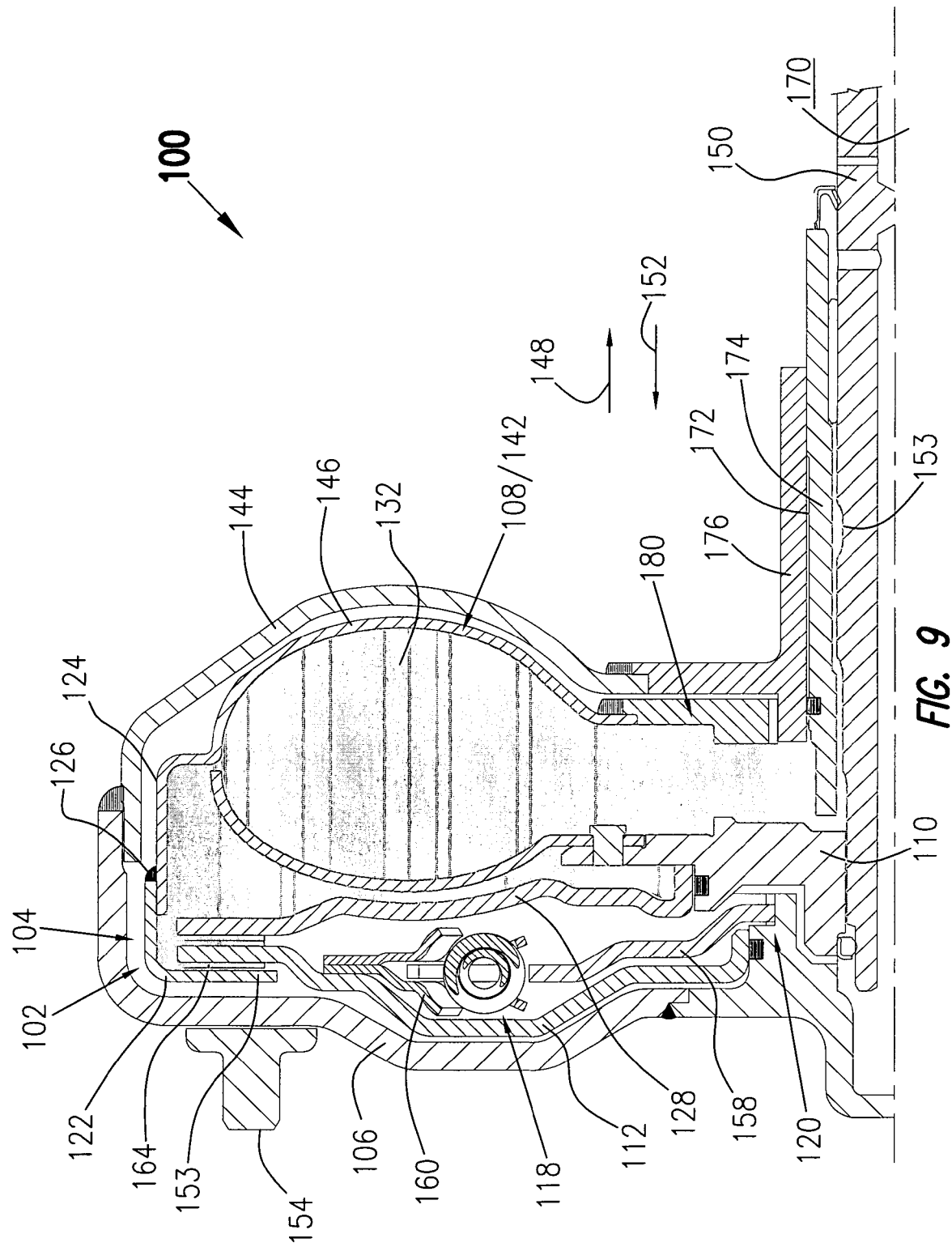
FIG. 9 is a partial cross-sectional view of the torque converter in FIG. 8 showing the impeller charge chamber.

FIG. 9 is a partial cross-sectional view of the torque converter in FIG. 8 showing impeller charge chamber 132.

Figure 10:
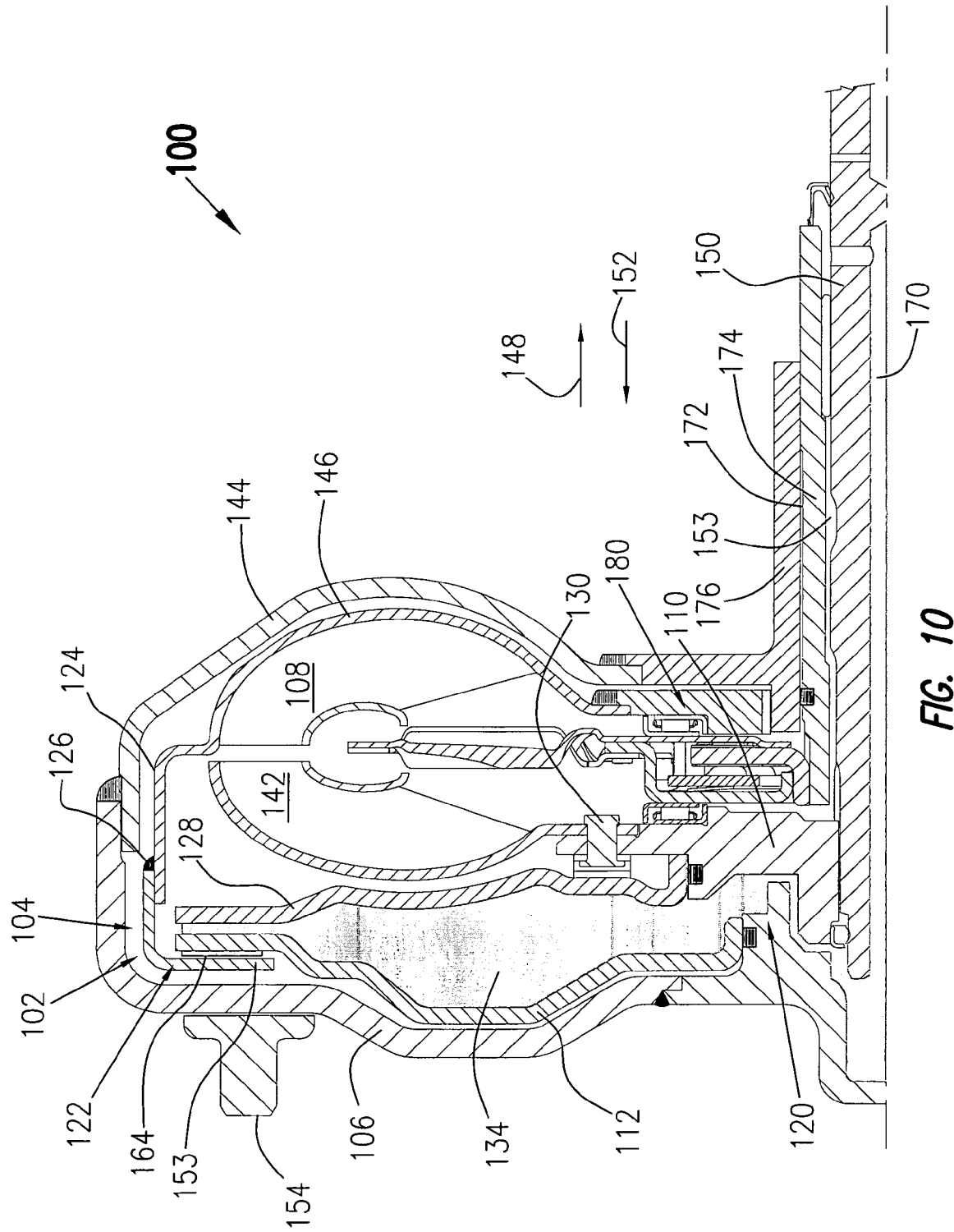
FIG. 10 is a partial cross-sectional view of the torque converter in FIG. 8 showing the inner chamber.
Figure 11:
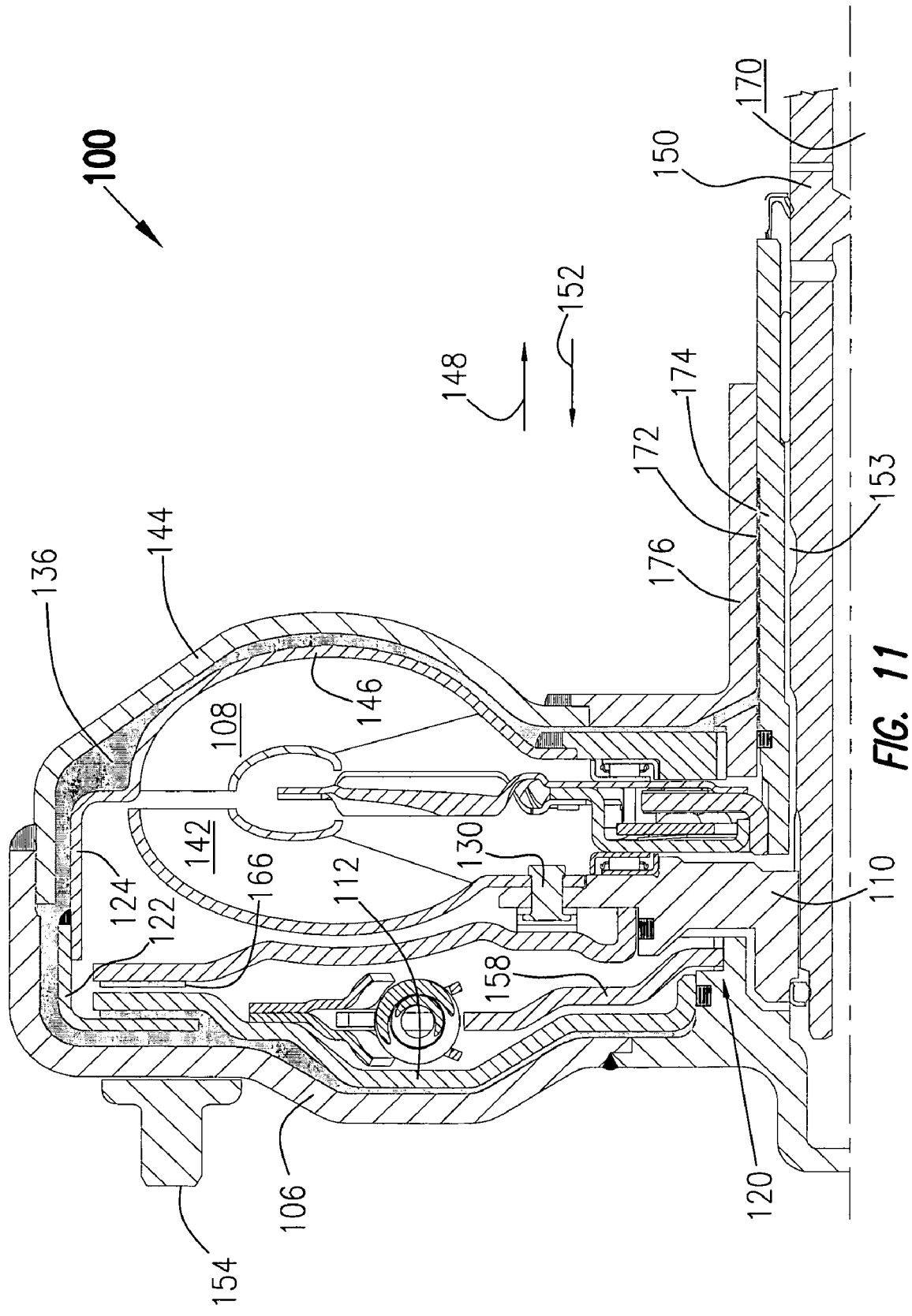
FIG. 11 is a partial cross-sectional view of the torque converter in FIG. 8 showing the outer chamber; and, FIG. 12 is a partial cross-sectional view of the torque converter in FIG. 8 showing torque transmission paths.

FIG. 10 is a partial cross-sectional view of the torque converter in FIG. 8 showing inner chamber 134; and, FIG. 11 is a partial cross-sectional view of the torque converter in FIG. 8 showing outer chamber 136.

Figure 12:
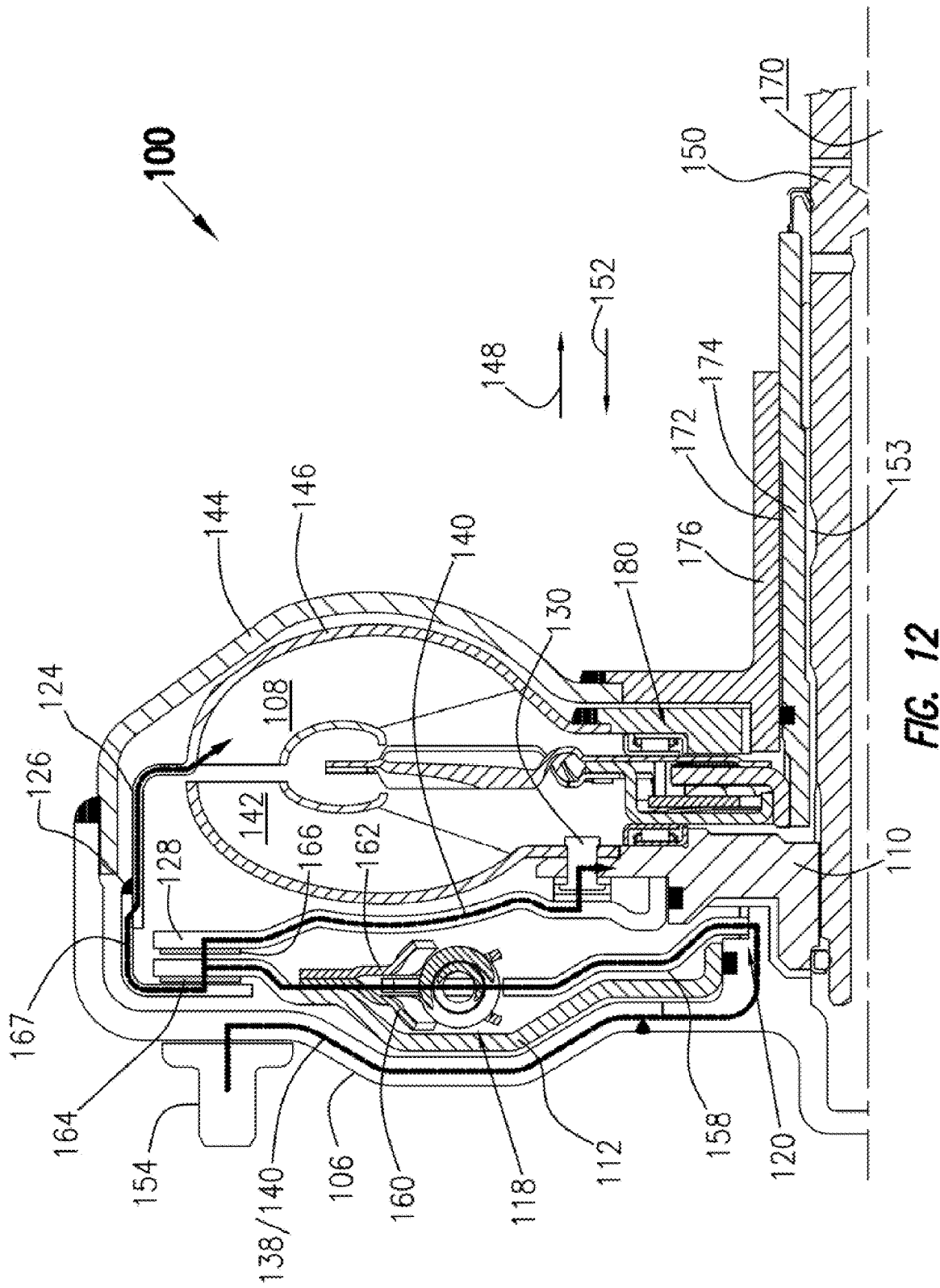

FIG. 12 is a partial cross-sectional view of the torque converter in FIG. 8 showing torque transmission paths 138 and 140. The following should be viewed in light of FIGS. 8 through 12. Clutch 102 is located in a torque transmission path between cover 106 and impeller 108, through plate 112 and assembly 118. In some aspects, the path is path 138. Clutch 104 is located in a torque transmission path between cover 106 and hub 110, through plate 112 and assembly 118. In some aspects, the path is path 140. The paths are mechanical paths. That is, the paths are made up of interconnected solid elements. As a comparison, a fluid torque path can be formed between an impeller and a turbine in a torque converter by fluid in the torus of the torque converter. As described infra, manipulation of the respective hydraulic pressures in chambers 132, 134, and 136 causes the clutches to open and close, which subsequently opens and closes the torque transmission paths. By opening a torque transmission path, we mean breaking or interrupting the path. That is, the path is not able to transmit torque along its full length. Alternately stated, the path is made discontinuous. For example, one end of the torque path may experience a torque, but the torque is not transmitted to the other end. By closing a torque transmission path, we mean making the path continuous so that the path is able to transmit torque along its full length.

Chamber 132 includes turbine 142 and impeller 108 and is at least partially defined by extension 124 and plates 122 and 128. By partially defined, we mean that the extension and plates form at least part of the boundaries or containment of the chamber. Chamber 134 is at least partially defined by plates 112 and 128. Chamber 136 is at least partially defined by torque converter cover 144, impeller cover 146, extension 124, cover 106, and plates 112 and 122.

To operate torque converter 100 in an engine idle mode, that is, the engine (not shown) for a vehicle (not shown) in which torque converter 100 is installed is idling, both clutch 102 and clutch 104 are opened. To accomplish this, fluid in chamber 132 is maintained at a pressure less than pressure for fluid in chamber 134, axially displacing plate 128 in direction 148 and opening clutch 104. Pressure for fluid in chamber 136 is maintained at a level greater than pressure for fluid in chamber 134, axially displacing plate 112 in direction 148 and opening clutch 102. In this configuration, no torque is transmitted to hub 110, which, when converter 100 is installed in the vehicle, is rotationally connected to input shaft 150 for a transmission (not shown). Thus, the cover and the hub are able to rotate independent of each other and no engine torque is transmitted to the transmission. Specifically, the turbine is disconnected from the hub and the impeller is disconnected from cover 106 so that engine torque is not transmitted to the impeller and subsequently, to the turbine, which is rotationally connected to the hub.

Alternately stated, the hub, which is rotationally connected to the transmission, is rotationally disconnected from the portions of the torque converter receiving torque from the engine (cover 106) and rotation between cover 106 and the impeller is interrupted. Thus, the portions of the converter directly or indirectly connected to the engine are rotationally disconnected from the hub. Therefore, the load seen by the engine due to the connection of the engine to the torque converter is reduced, improving fuel economy for the engine.

To operate torque converter 100 in a torque converter mode, that is, operating the converter so that turbine 142 multiplies torque from impeller 108, clutch 104 is opened and clutch 102 is closed. To accomplish this, fluid in chamber 134 is maintained at a pressure greater than fluid in chamber 132, axially displacing plate 128 in direction 148 and opening clutch 104. Fluid in chamber 134 is maintained at a pressure greater than fluid in chamber 136, axially displacing plate 112 in direction 152 and closing clutch 102. That is, plates 112 and 122 are rotationally connected. In this configuration, path 138 is closed, path 140 is opened, and torque is transmitted from cover 106 through assembly 118 to clutch 102 and on to impeller 108. That is, impeller 108 is rotationally connected to cover 106 and turbine 142 is energized by the impeller and rotates hub 110.

During operation in torque converter mode, heat is generated by the turbine and impeller. Advantageously, converter 100 is arranged to provide a flow of fluid through chamber 132 during torque converter mode to cool the turbine and impeller. Thus, a same hydraulic operation and chambers are used to manipulate the clutches to enact the torque converter mode and to provide cooling flow to the torus. In some aspects, and chambers 132 and 134 are in fluid communication. Since clutch 104 is open, fluid flows from chamber 134 to chamber 132 and channel 153, since pressure in chamber 134 is higher. As a result, the cooling flow for the torus bypasses the friction material (described infra) for clutch 102. By bypass we mean the fluid does not pass through openings in the friction material, although the fluid may flow across an edge or boundary of the material. Torque converter 100 resolves the problems associated with pressure in the impeller clutch release chamber and the torus, since the release chamber (chamber 136) is hydraulically isolated from the torus (chamber 132) in torque converter mode.

To operate torque converter 100 in a lock-up mode, that is, connecting housing 106 to hub 110, clutch 104 is closed. In some aspects, clutch 102, which is closed in torque converter mode, remains closed in lock-up mode. In some aspects, clutch 102 is opened in lock-up mode. This sequence is further described infra. Keeping clutch 102 closed introduces the inertia of the impeller to the torque transmission path. The impeller inertia can be used to affect the natural frequency of the torque converter during lock-up mode to tune out undesirable resonance.

To close clutch 104, fluid in chamber 132 is maintained at a pressure greater than pressure for fluid in 134, axially displacing plate 128 in direction 152. That is, plates 112 and 128 are rotationally connected. In this configuration, path 140 is closed and torque is transmitted from cover 106 to assembly 118 and plates 112 and 128 (through clutch 104) to hub 110. That is, cover 106 is rotationally connected to hub 110.

To close clutch 102, fluid in chamber 138 is maintained at a pressure less than pressure for fluid in 134, axially displacing plate 112 in direction 152. To open clutch 102, fluid in chamber 138 is maintained at a pressure greater than fluid in chamber 134, axially displacing plate 112 in direction 148. If clutch 102 is open, path 138 is open. If clutch 102 is closed, path 167 links the pump inertia to path 140.

Portion 163 of plate 122 is located axially to one side of the remaining portions of clutches 102 and 104. Specifically, portion 163 is axially between cover 106 and the remaining portions. Thus, plate 112 axially displaces toward cover 106 in direction 152 to engage clutch 102. Plate 128 also displaces in direction 152 to contact plate 112 as part of the engagement of clutch 104.

Clutches 102 and 104 advantageously reduce the number of "hand-offs" needed to operate converter 100, for example, during the transition from torque converter mode to lock-up mode. Specifically, the clutches can be simultaneously engaged so that only one clutch need be operated at a time. For example, clutch 102 is engaged when the transition from torque converter mode to lock-up mode is initiated and remains closed as clutch 104 is engaged (no new operation is required for clutch 102). Once clutch 104 is engaged and no further operation is required for that clutch, clutch 102 can be opened. By reducing the number of hand-offs, the control scheme for the clutches can be simplified, reducing the overall complexity of converter 100. Alternately stated, it is not necessary to coordinate the simultaneous engagement and release of respective clutches. That is, the necessity to coordinate the simultaneous release and increase of respective hydraulic pressure in chambers within the torque converter is reduced or eliminated.

As shown supra, plate 112 is involved in the operation, specifically, the torque transmitting mode, for each of clutches 102 and 104. That is, plate 112 forms a "back to back" configuration that is used by both clutches and advantageously reduces the axial space needed for the clutches, thereby advantageously reducing the overall axial length of torque converter 100. Further, plate 112 advantageously reduces the complexity of torque converter 100, for example, fewer plates are needed to construct the impeller and torque converter clutches, since plate 112 is common to both clutches.

It should be understood that the pressures referenced supra are relative and are not restricted to any particular value or range except for the values or ranges inherent in the overall design, configuration, and operation of a particular torque converter 100.

Cover 106 can be connected to the engine by any means known in the art. In some aspects, studs 154 are used. In some aspects, assembly 102 includes a plurality of coil springs 156 mounted on flange 158 and cover plates 160 and 162.

Friction material 164 is axially disposed between plates 112 and 122. Clutch 102 is not limited to any particular type or configuration of friction materials. In some aspects, friction material is fixedly secured to one or both of the plates. In some aspects (not shown), a clutch plate is disposed axially between the plates. Friction material 166 is axially disposed between plates 112 and 128. Clutch 104 is not limited to any particular type or configuration of friction materials. In some aspects, friction materials are fixedly secured to one or both of the plates. In some aspects (not shown), clutch plates are disposed axially between the plates.

In some aspects, converter 100 includes a three-pass hydraulic system. In this system channels 153, 170 and 172 transport fluid to and from chambers 132, 134, and 136, respectively. Channel 153 is radially disposed between shaft 150 and stator shaft 174 and is in fluid communication with chamber 132. Channel 170 is located inside shaft 150 and is in fluid communication with chamber 134. Channel 172 is radially disposed between shaft 174 and flange 176 and is in fluid communication with chamber 136.

A present invention torque converter, for example, torque converter 100, presents a reduced load during engine idle. By presenting a reduced load, we mean that during an idle mode for the engine, the torque converter reduces the load seen by the engine from the torque converter.

Clutches 102 and 104, damper assembly 118, and plate 112 are shown with specific shapes, sizes, and configurations. However, it should be understood a present invention torque converter is not limited to the shapes, sizes, and configurations shown and that other shapes, sizes, and configurations in accordance with the descriptions supra are included within the spirit and scope of the claims. Torque converter 100 has been shown with a specific configuration of ancillary components, for example, stator one-way clutch 180. However, it should be understood that a present invention torque converter is not limited to the specific ancillary parts and configuration of ancillary parts shown in the figures, and that other ancillary parts and configurations are included in the spirit and scope of the claimed invention.

The present invention also includes a method of operating a torque converter. Although the method is described as a sequence of steps for clarity, no order should be inferred unless explicitly stated. A first step maintains pressure for fluid in a second chamber greater than pressures for respective fluids in first and third chambers. The first chamber includes a torus. A third step closes, in response to maintaining hydraulic pressure in the first, second and third chambers, a torque transmission path between the cover and an impeller. A fourth step establishes fluid communication between the first and second chambers. A fifth step flows the fluid from the second chamber to the first chamber to cool the torus. The torque path between the cover and the impeller includes friction material and a sixth step bypasses the friction material with the flow between the second and first chambers. In some aspects, an additional step opens, in response to maintaining hydraulic pressure in the first, second and third chambers, a mechanical torque transmission path between a cover for the torque converter and an output hub. In some aspects, the torque converter includes a damper assembly and the torque transmission paths pass through the damper assembly. In some aspects, the torque converter is converter 100.

The present invention further includes a method of operating a torque converter. Although the method is described as a sequence of steps for clarity, no order should be inferred unless explicitly stated. A first step engages an impeller clutch to transmit torque from a cover for the torque converter through a damper assembly to an impeller. A second step engages, while the impeller clutch remains engaged, a torque converter clutch to transmit torque from the cover through the damper assembly to an output hub. The impeller clutch and the torque converter clutch each include a same piston plate and the impeller clutch includes a first portion exclusive of the plate, the torque converter clutch includes a second portion exclusive of the plate, and the plate is axially disposed between the first and second portions. In some aspects, the torque converter is converter 100.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

I claim:

1. A torque converter comprising:
    a turbine;
    a single impeller;
    a seal;
    a first clutch;
    a second clutch including a piston plate connected to the turbine so as to rotate with the turbine, the piston plate arranged to open or close the second clutch; and,
    a plate disposed in a torque transmission path from a cover for said torque converter to said first and second clutches and including an end in direct contact with the seal, wherein said first and second clutches each comprise said plate.

2. The torque converter of claim 1 further comprising an impeller and an output hub and wherein said first clutch comprises an impeller clutch arranged to transmit torque from said cover to said impeller and wherein said second clutch comprises a torque converter clutch arranged to transmit torque from said cover to said output hub.

3. The torque converter of claim 2 wherein said impeller clutch comprises a first portion exclusive of said plate, said torque converter clutch comprises a second portion exclusive of said plate, and said plate is axially disposed between said first and second portions.

4. The torque converter of claim 1 further comprising a damper assembly disposed in said torque transmission path.

5. The torque converter of claim 4 wherein said plate disposed in the torque transmission path is connected to said damper assembly.

6. A torque converter comprising:
    a single impeller;
    a first cover;
    an impeller clutch including a first piston plate, a first plate directly connected to the single impeller, and first friction material axially disposed between the first piston plate and the first plate; and,
    a torque converter clutch including the first piston plate, a second piston plate connected to an output hub for said torque converter, and second friction material, wherein:
    when the impeller clutch is open, the single impeller is rotatable independent of rotation of the first cover;
    the first piston plate is displaceable such that the first friction material is in contact with the first plate and the first piston plate; and,
    the second piston plate is displaceable such that the first and second piston plates are in contact with the second friction material.

7. The torque converter of claim 6 wherein said first piston plate is displaceable to at least partially enable closing of said impeller clutch and said torque converter clutch.

8. The torque converter of claim 6 further comprising a damper assembly rotationally connected to said first piston plate and said cover.

9. The torque converter of claim 6 further comprising a second cover for the single impeller; a turbine; a third cover for the turbine; a fourth cover connected to the first cover; a first chamber including said turbine and said single impeller and at least partially defined by said first plate, said second piston plate, and said third cover; a second chamber at least partially defined by said first and second piston plates; and a third chamber at least partially defined by said second and fourth covers, said first piston plate, and said first plate, wherein in a torque converter mode, pressure for fluid in said second chamber is arranged to be greater than pressures for respective fluids in said first and third chambers, and said first and second chambers are in fluid communication.

10. The torque converter of claim 9 wherein said fluid in said second chamber is arranged to flow through said first chamber to cool said turbine and impeller.

11. The torque converter of claim 10 wherein said flow of fluid from said second chamber to said first chamber bypasses said first friction material.

12. A torque converter comprising:
    a damper assembly connected to a cover for said torque converter and including a flange passing through a plurality of springs and first and second side plates axially bracketing the flange;
    an impeller clutch connected to an impeller and including first friction material;
    a torque converter clutch connected to an output hub for said torque converter and including second friction material; and,
    a plate included in said impeller clutch and in said torque converter clutch and connected to said damper assembly, wherein the plate is free of engagement with the plurality of springs, said impeller clutch comprises a first portion exclusive of said plate, said torque converter clutch comprises a second portion exclusive of said plate, said plate is axially disposed between said first and second friction material, and the plate includes an end disposed radially inward of the plurality of springs.

* * * * *